May 7, 1929.  W. B. FORCE  1,712,469
DENTAL TOOL
Filed Jan. 5, 1928
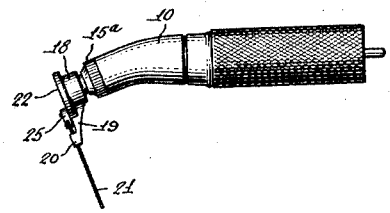
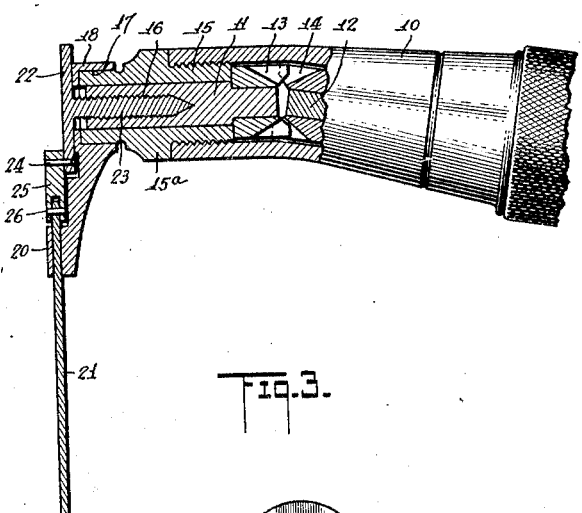
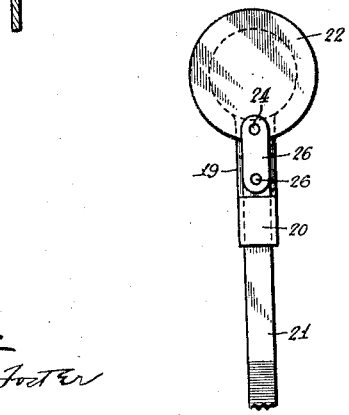
WITNESSES
INVENTOR
Willard B. Force.
BY
ATTORNEY Patented May 7, 1929.

1,712,469

UNITED STATES PATENT OFFICE.

WILLARD B. FORCE, OF NEW YORK, N. Y.; JULIANA RIESER FORCE ADMINISTRATRIX OF SAID WILLARD B. FORCE, DECEASED.

DENTAL TOOL.

Application filed January 5, 1928. Serial No. 244,672.

The present invention is concerned with the provision of a unique reciprocating dental tool and with means for conveniently supporting and driving it from the usual drill chuck.

More specifically the invention contemplates the use of a power driven reciprocating file which may have a wide range of utility, but which is particularly helpful for cutting down the abutting faces of an adjacent tooth, and smoothing off fillings emplaced in such faces or preparing the tooth for filling.

The abrasive discs or cutter disc now in use for this purpose are objectionable in that with them it is necessary to cut away a very large section of the tooth, while with the present device the tool may be small, and one of the abutment tooth surfaces may be conveniently undercut at any desired point without cutting down the whole tooth to get at the desired spot.

Another advantage of the tool, is the fact that the reciprocating file produces very little heat, while the friction of the stone or sandpaper disc cutters generates heat very rapidly and consequently causes considerable loss of time to the dentist and discomfort to the patient.

Other objects of the invention are to provide a tool of extremely simple, practical construction, which will be rugged, durable and efficient in use, and well suited to the requirements of economical manufacture and convenient manipulation.

With the above noted and other objects in view, the invention consists in certain novel features of construction and combinations and arrangements of parts as will be more fully hereinafter set forth and pointed out in the claim. The invention may be more fully understood from the following description in connection with the accompanying drawings, wherein—

Fig. 1 is a side elevational view showing my improved tool secured to the ordinary drill handle and chuck.

Fig. 2 is an enlarged sectional view showing the manner of attaching the tool to the chuck and the manner of supporting the tool guide.

Fig. 3 is an end view of Fig. 2.

In the drawings I have used the reference numeral 10 to designate a conventional type of hollow drill handle in which two sections 11 and 12 of a flexible drive shaft are universally coupled together by bevelled gears 13 and 14 of a conventional type. Outward axial displacement of the shaft end 11 is prevented by screwing a sleeve 15 into the threaded mouth of the drill handle, this sleeve abutting the gear 13 and being provided with a lateral extension 15$^a$ which abuts the end of the handle 10. The sleeve constitutes a bearing for the shaft section 11 which section may be conveniently utilized as a chuck for carrying a tool to be driven.

To serve the chuck function, shaft-section 11 is formed at its outer end with a threaded socket 16.

The reduced and smooth outer end 17 of the sleeve 15 serves in the present instance to support a collar 18, which collar is slipped over the sleeve end 17 and frictionally fits the same. The collar is provided with a laterally extending arm 19 having an integral tool guiding sleeve or bracket portion 20.

Reciprocable within the sleeve 20 is a file or equivalent tool 21. The means for translating the rotary movement of the member 11 into a reciprocating movement of the file 21 includes a disc 22 having an integral stem portion 23 screwed into the socket 16. A pin 24 mounted near the edge of the disc 22 is pivotally connected to one end of a link 25, the other end of said link being pivoted as by a pin 26 to the end of the file 21.

Thus, as the shaft 12, 11 is rotated, disc 22 rotates and the connection between the disc and file provided by the pin 24 and link 25 causes reciprocation of the file.

The file may be set to reciprocate at any desired angle relatively to the axis of the chuck 11 by the simple expedient of manually rotating the sleeve 18. This sleeve it will be noted, fits the sleeve end 17 so snugly that accidental turning of the sleeve is prevented but it may be manually turned to vary the relative positions of the file and the drill handle 10.

The tool which I have described above is particularly helpful in cutting or reducing overhanging filling material edges in the approximal stopping around the neck of teeth. While it may be used on free surfaces of the teeth, it is particularly helpful for working in tight approximal spaces and for reducing occlusal surfaces.

110

Obviously, various changes and alterations might be made in the general form and arrangement of the parts described without departing from the invention. Hence I do not wish to limit myself to the precise details set forth, but shall consider myself at liberty to make such changes and alterations as fairly fall within the spirit and scope of the appended claim.

I claim:

A tool of the class described including a sleeve-like holder, a chuck rotatable therein, tool guiding means supported from the holder, a tool mounted to reciprocate in said guide means, a drive disc fixed to the chuck and operative connections between said disc and tool, the support for the tool guide means comprising a collar encircling the holder and integral with the guide means, the collar being frictionally secured on and manually adjustable about the holder.

Signed at New York, in the county of New York and State of New York, this 30th day of December, A. D. 1927.

WILLARD B. FORCE.